(12) United States Patent
Fujita et al.

(10) Patent No.: US 10,424,006 B2
(45) Date of Patent: Sep. 24, 2019

(54) AUTOMATIC ORDERING OF PRODUCTS

(71) Applicant: ACCENTURE GLOBAL SOLUTIONS LIMITED, Dublin (IE)

(72) Inventors: Yukihisa Fujita, Tokyo (JP); Takahiro Sasaki, Tokyo (JP); Takuya Kudo, Kirkland, WA (US); Kana Cornett, Saitama (JP); Akira Yotsuyanagi, Tokyo (JP); Takaaki Haraguchi, Chiba (JP)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 286 days.

(21) Appl. No.: 15/641,935

(22) Filed: Jul. 5, 2017

(65) Prior Publication Data
US 2019/0012721 A1    Jan. 10, 2019

(51) Int. Cl.
G06Q 30/00 (2012.01)
G06Q 30/06 (2012.01)
G06Q 10/08 (2012.01)
G06K 7/10 (2006.01)

(52) U.S. Cl.
CPC ..... *G06Q 30/0635* (2013.01); *G06K 7/10297* (2013.01); *G06Q 10/087* (2013.01)

(58) Field of Classification Search
CPC .................................................. G06Q 30/00
USPC ............................................................ 705/28
See application file for complete search history.

(56) References Cited

U.S. PATENT DOCUMENTS

| | | | |
|---|---|---|---|
| 2007/0136153 A1* | 6/2007 | Chun ................ | G06Q 10/087 705/28 |
| 2009/0281930 A1* | 11/2009 | Sakagami ........ | G01N 35/00623 705/28 |
| 2012/0136741 A1* | 5/2012 | Agarwal ............ | G06Q 10/00 705/26.1 |

* cited by examiner

*Primary Examiner* — Russell S Glass
(74) *Attorney, Agent, or Firm* — Mannava & Kang, P.C.

(57) ABSTRACT

A system for automatic ordering of products comprises a receiver to receive stock parameters including a number of products sold till a point in time, an expiration duration for usage of products, or a number of products available in an inventory at the time. The system also includes a stock analyzer to determine a stock-out probability factor based on the number of products sold and estimated short term sales, determine a disposal probability factor based on the number of products sold, the expiration duration and estimated long term sales, ascertain a risk balance factor indicative of a ratio of the disposal probability factor to the stock-out probability factor, determine a number of products to replenish the inventory, based on the stock-out probability factor, the disposal probability factor, and the risk balance factor, and place a purchase order to a vendor for acquiring the number of products for replenishing the inventory.

20 Claims, 7 Drawing Sheets

AUTOMATIC ORDERING OF PRODUCTS

TECHNICAL FIELD

The present disclosure relates to product replenishment and in particular, relates to systems and methods for forecasting sales and automatic ordering of products for replenishment, accordingly.

BACKGROUND

In retail or convenience stores, it is helpful to ensure that inventory is properly stocked at all times in order to ensure smooth and profitable running of business. For example, in the case of perishable items, such as food products, the inventory has to be stocked such that demand is met while simultaneously ensuring that the stock is consumed or sold before expiration of usage duration of a product. A probability of selling out of a stock of a product may be known as the stock-out risk of the product. Further, a probability of wastage of a product due to expiration of corresponding usage duration before a sale, may be known as the disposal risk of the product.

The stock-out of a product results in a loss of opportunity of more sales since customer demand could not be met by a retail outlet such as, for example, a convenience store. On the other hand, the disposal of a product results in economic loss to the retail outlet due to wastage. Therefore, staying ahead and optimizing profit in today's cut-throat competitive environment, planning and management of the inventory and automatically reordering an appropriate amount of inventory is a challenging but necessary task.

Conventional approaches use fulfillment or replenishment schemes that are prepared for different products based on factors, such as usage duration, shelf space, supply, and demand of a product. If the usage duration for a product is fairly lengthy and the corresponding sale size for the product is large, the stock-out risk for the product is low. Therefore, a replenishment scheme for the product can be formulated that focuses on the stock-out risk. On the other hand, if the usage duration is short or the sale size is small, the replenishment scheme can be formulated to focus on the disposal risk.

For instance, in the case of fresh food products, an attempt to minimize the stock-out risk may result in a drastic increase in the disposal risk. Furthermore, products sold in bookstores and pharmacies generally have long usage duration but a small sales size. In such cases the disposal risk may be significantly high, as a sufficient amount of stock cannot be kept due to limited storage space.

Conventional techniques determine a number of products required for a future time based on past sales considering stock-out risk only. Such techniques do not consider the disposal risk as a factor for replenishment of the products. Further, the entire process is time-intensive and follows a fragmented approach. Therefore, the conventional techniques offer a fragmented approach for replenishment of the products and are time-intensive and complex. There is therefore a need for techniques that forecast the amount of inventory to be ordered based on both the stock-out risk and the disposal risk of a product and then automatically order such inventory.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
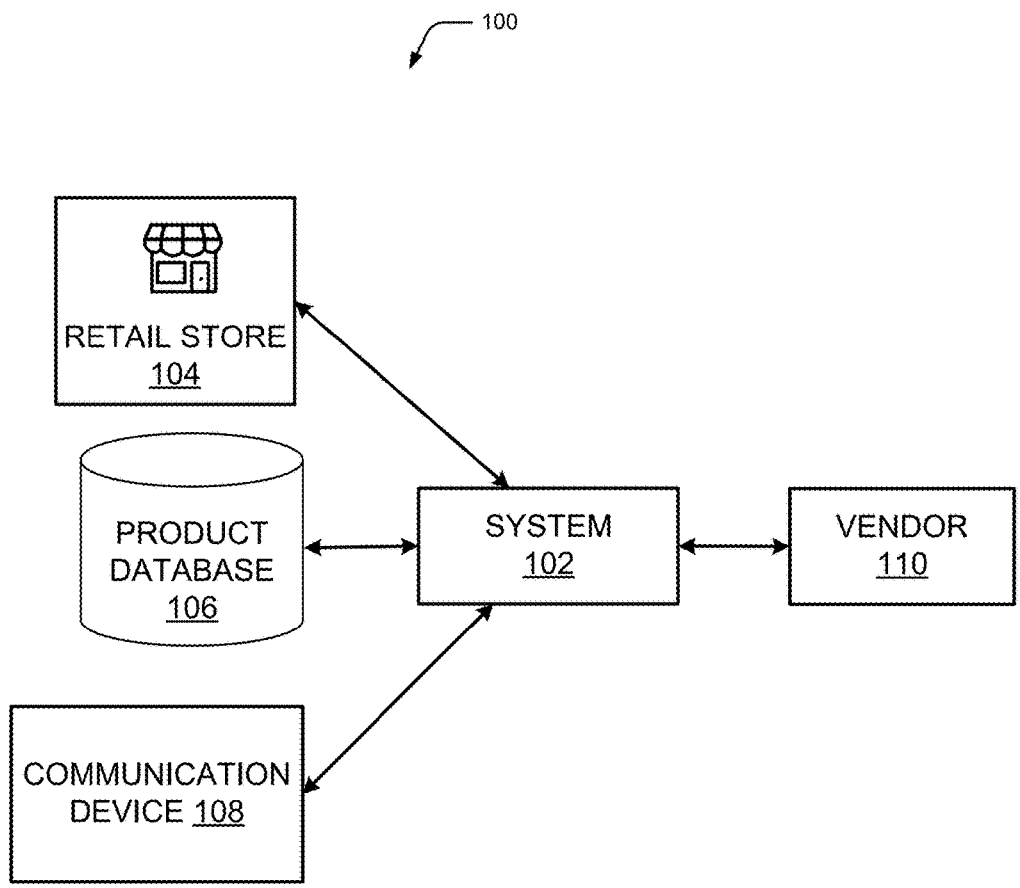
FIG. 1 illustrates an environment for implementation of a system for automatic ordering of products, according to an example embodiment of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The present subject matter describes one or more systems and methods for forecasting and automatically ordering products. Although the overview is explained with respect to one of the systems of the present disclosure, the overview is equally applicable to other implementations, without departing from the scope of the present disclosure.

In an example embodiment, an adaptive system, hereinafter referred to as system, for automatic ordering of products is disclosed. The system may include a receiver, a stock analyzer, and a learner. The receiver, the stock analyzer, and the learner may be in communication with each other for automatic ordering of the products. The products may include, but are not limited to, perishable products, medicines, seasonal products, etc. Further, the system may be implemented for automatic ordering of products in a retail outlet such as, for example, a convenience store.

The receiver may receive stock parameters pertaining to one or more products available in the retail store. The stock parameters may include, but are not limited to, a number of products sold till a point in time, an expiration duration for usage of products, or a number of products available in an inventory at the point in time. The expiration duration of a product may be understood as a duration of usage for the product.

The stock analyzer may receive the stock parameters from the receiver. The stock analyzer may determine a stock-out probability factor, which is indicative of a probability of selling out the number of products available in the inventory.

In an example embodiment, the stock analyzer may determine the stock-out probability factor based on the number of products sold and estimated short term sales. The stock analyzer may also determine a disposal probability factor, which is indicative of a probability having to dispose products after the expiration duration is over. In an example embodiment, the stock analyzer may determine the disposal probability factor based on the number of products sold, the expiration duration, and estimated long term sales.

Upon determination of the stock-out probability factor and the disposal probability factor, the stock analyzer may ascertain a risk balance factor. The risk balance factor is indicative of a ratio of the disposal probability factor to the stock-out probability factor. The stock analyzer may then determine a number of products to replenish the inventory, based on the stock-out probability factor, the disposal probability factor, and the risk balance factor. Further, the stock analyzer may place a purchase order to a vendor for acquiring the number of products for replenishing the inventory.

The learner may store details pertaining to the number of products sold, the expiration duration, the number of products available in the inventory, the stock-out probability factor, the disposal probability factor, the risk balance factor, the number of products to replenish the inventory, and the placing of the purchase order, over a period of time. Further, the learner may forward the details to the stock analyzer for use in placing a new purchase order to acquire a number of products for replenishing the inventory at a subsequent point in time.

The system of the present disclosure offers an automated and comprehensive approach to replenishing inventory by considering a stock-out risk as well as a disposal risk for replenishment of products. The system determines an amount of stock required in the inventory by determining a minimum point of total risk. Therefore, the possibility of loss of opportunity due to a stock-out or possibility of economic loss due to a wastage of products is reduced or eliminated.

Further, an accuracy of analysis for replenishment of the inventory is also improved using implementations of the invention. For example, exemplary embodiments produce an improved inventory turnover as compared to conventional inventory management techniques. Also, the system automatically places order for replenishment of the inventory based on the stock-out probability factor and the disposal probability factor. Therefore, the possibility of error due to manual intervention is also eliminated. Because manual intervention is not required using implementations of the invention, the time required for the analysis is also significantly reduced.

In addition, exemplary implementations learn the details pertaining to the analysis for replenishment of the products performed at the point in time and uses the learnt details for performing the analysis at a subsequent point in time. This further improves the accuracy of the analysis. Moreover, the system offers flexibility in terms of implementation and, therefore, is easily scalable in order to accommodate increasing data volume and changes to other operational requirements. One of ordinary skill in the art will appreciate that the present disclosure offers a comprehensive, flexible, accurate, effective, intelligent, and proactive technology-based approach for automatically determining the appropriate amount of inventory to be ordered and placing the order so as to minimize risk and optimize profitability.

FIG. 1 illustrates an environment 100 for implementation of a system 102 for automatic ordering of products, according to an example embodiment of the present disclosure. The system 102 may be in communication with a retail store 104 and a product database 106. In an example embodiment, the system 102 may be implemented for replenishing the products in the retail store 104. However, it should be appreciated by a person skilled in the art that the scope of the present disclosure is not limited to retail stores, and may extend to any application of replenishment of products. In an example embodiment, the products may include, but are not limited to, food items which typically have short expiration duration, books which typically have long expiration duration, any other home product, or any product related to other industries. Furthermore, the product database 106 may be understood as a data repository pertaining to details of the products available in the retail store 104.

In an example embodiment, the functionalities of the system 102 may be availed by an operator, for example, an owner of the retail store 104 through a user interface (not shown). In an example embodiment, the owner may avail the functionalities through the user interface on a communication device 108. The communication device 108 may include, but is not limited to, a laptop, a desktop, and a smart phone. The system 102 may further be in communication with a vendor 110 designated to supply the products to the retail store 104 based on instructions transmitted by the system 102.

In an example embodiment, the system 102 may receive information pertaining to a number of products sold till a point in time and a number of products available in the inventory at the point in time from the retail store 104. The system 102 may also receive information identifying an expiration duration for usage of products from the product database 106. In an example embodiment, the number of products sold, the number of products in the inventory, and the expiration duration for usage of the products may collectively be referred to as stock parameters.

The stock parameters are not limited to the abovementioned parameters, and may include other parameters pertaining to stock of products available in the retail store 104 or a similar facility, without departing from the scope of the present disclosure. For example, the stock parameters may also include estimated short term sales and estimated long term sales for the products. In an example embodiment, the system 102 may estimate the short term sales and the long term sales based on the number of products available in the inventory. The details of the estimation of the short term sales and the long term sales are explained in subsequent sections of the present disclosure.

In addition, the system 102 may determine a stock-out probability factor and a disposal probability factor. The stock-out probability factor is indicative of a probability of selling out the number of products available in the inventory. In an example embodiment, the system 102 may determine the stock-out probability factor based on the number of products sold and the estimated short term sales.

On the other hand, the disposal probability factor is indicative of a probability of an event where the products are disposed one the expiration duration is reached. For example, an expiration duration may include an expiration date and products may be disposed of once the expiration date is reached. In an example embodiment, the system 102 may determine the disposal probability factor based on the number of products sold, the expiration duration, and the estimated long term sales. The details of the determination of the stock-out probability factor and the disposal probability factor are explained in subsequent sections of the description.

In an example embodiment, the system 102 may receive a risk balance factor from the owner through the communication device 108. The risk balance factor is indicative of a ratio of the disposal probability factor to the stock-out probability factor. Further, based on the stock-out probability factor, the disposal probability factor, and the risk balance factor, the system 102 may determine a number of products to replenish the inventory. After the determination, the system 102 may issue a purchase order to the vendor 110 for providing the number of products for replenishing the inventory. The system 102 may place the purchase order to minimize an overall risk of stock-out as well as of disposal. The constructional and operational features of the system 102 are explained in detail in the description of FIG. 2.

Figure 2:
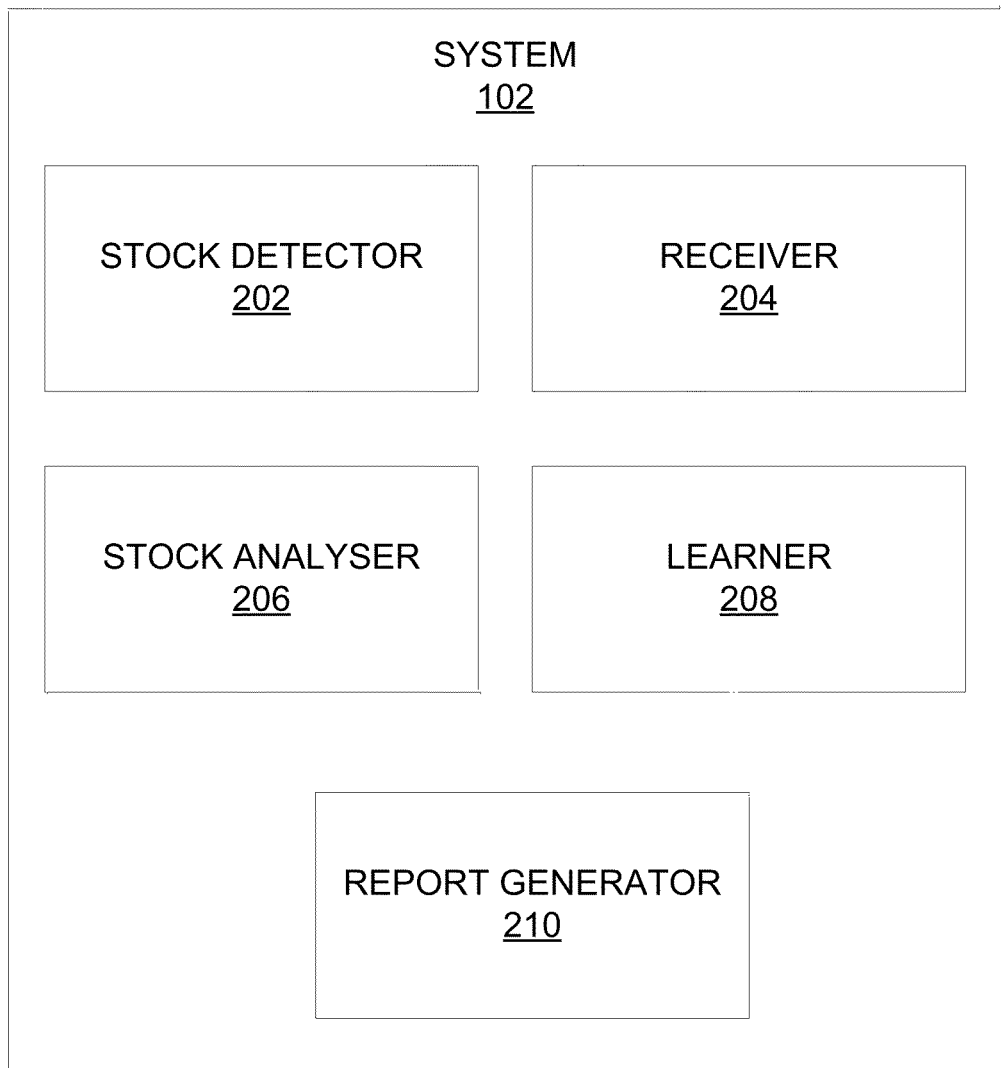
FIG. 2 illustrates a block diagram of the system, according to an example embodiment of the present disclosure.

FIG. 2 illustrates a block diagram of the system 102, according to an example embodiment of the present disclosure. For the sake of brevity, features of the system 102 that are already explained in the description of FIG. 1 are not explained in detail in the description of FIG. 2.

The system 102 may include a stock detector 202, a receiver 204, a stock analyzer 206, a learner 208, and a report generator 210. The stock detector 202 may be in communication with the receiver 204, the learner 208, and the report generator 210. The receiver 204 may further be in communication with the stock analyzer 206, the learner 208, and the report generator 210. The stock analyzer 206 may further be in communication with the learner 208 and the report generator 210. The learner 208 may further be in communication with the report generator 210.

The stock detector 202 may be installed in the retail store 104. The stock detector 202 may detect the number of products sold till a point in time and the number of products available in the inventory at the point in time. In an example embodiment, the stock detector 202 may include, but is not limited to, a Radio Frequency Identification (RFID) reader, a barcode scanner, a video or still frame capture device, or a sensor (e.g., a weight sensor, proximity sensor, etc). In case of the stock detector 202 being the RFID reader, each product may be marked with an RFID tag and the RFID reader may be positioned to sense RFID information from the tags on the products. In one example, based on a location of a product having the RFID tag with respect to a range of the RFID reader, the product may be marked as sold or unsold. Similarly, in case of the stock detector 202 being the barcode scanner, a product having a barcode may be marked sold when detected by the barcode scanner positioned at a payment counter of a retail store.

Similarly, a position of the product may be monitored through the video capture device, in an example embodiment, and the product may be marked as sold or unsold, based on the position. Further, the sensor used may be a displacement sensor or a motion sensor, which may detect a displacement, or a motion of the product to mark the product as sold or unsold. Based on such marking of the products, the stock detector 202 may detect the number of products sold and the number of products remaining in inventory. Upon such detection, the stock detector 202 may send information identifying the number of the products sold and the number of products available in the inventory to the receiver 204.

The receiver 204 may receive the details from the stock detector 202. Further, the receiver 204 may receive information identifying the expiration duration for usage of each of the products from an external database or an internal database. In an example embodiment, the external database may include, but is not limited to, a website associated with the product, such as a manufacturer or distributor's website.

On the other hand, an internal database may include, but is not limited to, a data repository of product details maintained by the system 102. In an example embodiment, the internal database may be the product database 104.

Upon receipt of the stock parameters by the receiving unit 104, the stock analyzer 206 may determine the stock-out probability factor and the disposal probability factor.

Based on the stock-out probability factor and the disposal probability factor, the stock analyzer 206 may determine the risk balance factor. Further, based on the stock-out probability factor, the disposal probability factor, and the risk balance factor, the stock analyzer 206 may determine the number of products to replenish the inventory. In an example embodiment, the stock analyzer 206 may determine the number of products to replenish the inventory, based on historical data pertaining to past sales of the products. After the determination, the stock analyzer 206 may place the purchase order to a vendor 110 to acquire a determined number of products for replenishing the inventory.

The system 102 may include learner 208 to store details pertaining to the number of products sold, the expiration duration, the number of products available in the inventory, the stock-out probability factor, the disposal probability factor, the risk balance factor, the number of products to replenish the inventory, and the placing of the purchase order. In an example embodiment, the learner 208 may store the details over a predetermined period of time. In an example embodiment, the learner 208 may further forward the details stored over the predetermined period of time to the stock analyzer 206 for placing a new purchase order to acquire a number of products for replenishing the inventory at a subsequent point in time.

In an example embodiment, the report generator 210 may generate a report pertaining to the placing of the purchase order. In an example embodiment, the report may include, but is not limited to, the number of products sold, the expiration duration, the number of products available in the inventory, the stock-out probability factor, the disposal probability factor, the risk balance factor, and the number of products to replenish the inventory.

Figure 3:
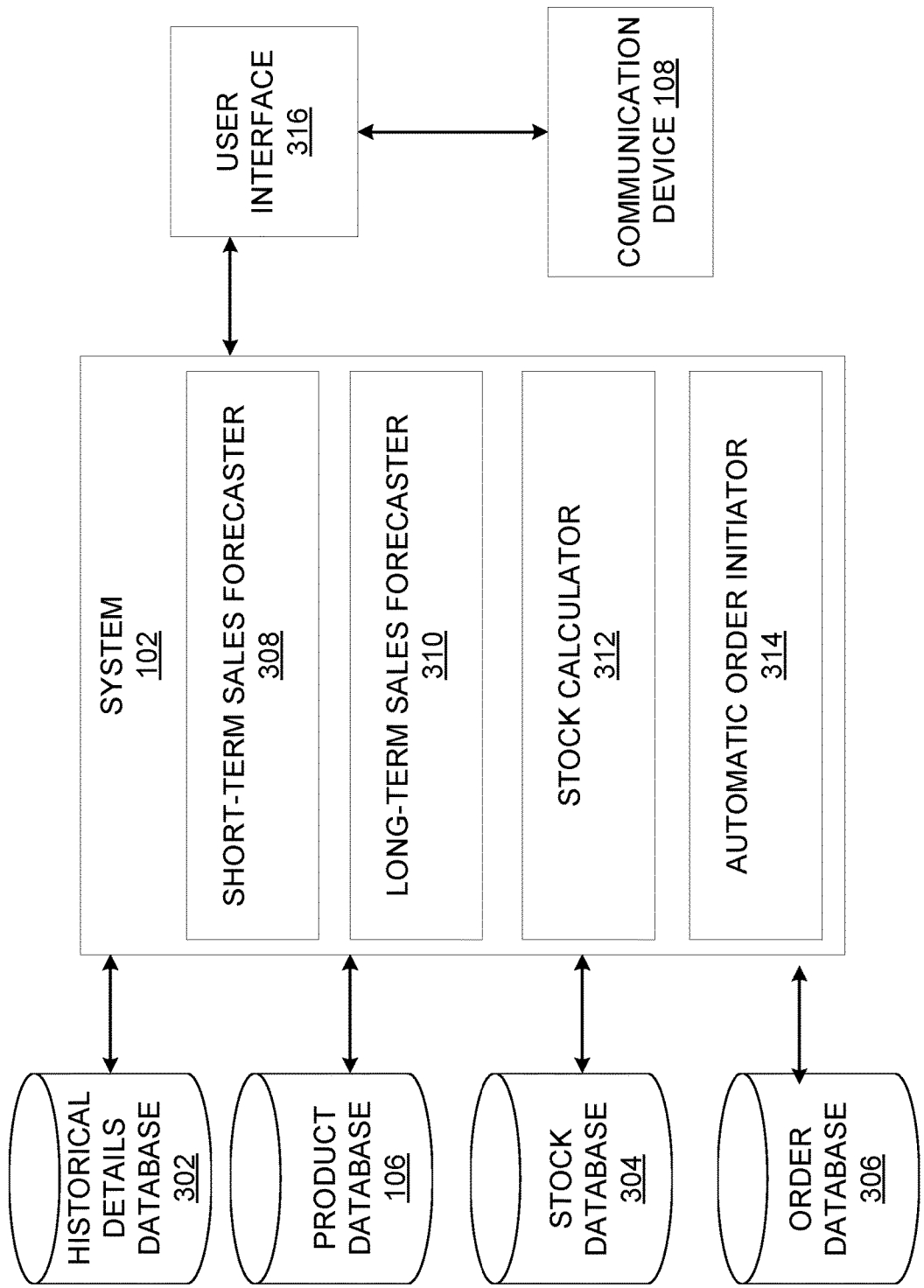
FIG. 3 illustrates another block diagram of the system, according to an example embodiment of the present disclosure.

FIG. 3 illustrates another block diagram of the system 102, according to an example embodiment of the present disclosure. For the sake of brevity, features of the system 102 that are already explained in the description of FIG. 1 and FIG. 2 are not explained in detail in the description of FIG. 3. In an example embodiment, the system 102 may include components in addition to the components of FIGS. 1 and 2 or in addition to the components of FIGS. 1 and 2.

In an example embodiment, the system 102 may be in communication with a historical details database 302, the product database 106, a stock database 304, and an order database 306. Historical details database 302 may operate as a data repository of historical data of the system 102. The stock database 304 may include details pertaining to the stock of the retail store 104 collected over a period of time. The order database 306 may include details pertaining to the orders placed by the system 102 over a period of time.

Further, the system 102 may include a short-term sales forecaster 308, a long-term sales forecaster 310, a stock calculator 312, and an automatic order initiator 314. The short-term sales forecaster 308 may be in communication with the historical details database 302 and the stock calculator 312. The long-term sales forecaster 310 may be in communication with the historical details database 302, the product database 106, and the stock calculator 312. The stock calculator 312 may be in communication with the automatic order initiator 314. The automatic order initiator 314 may be in communication with the stock database 304 and the order database 306. Further, the system 102 may be in communication with the owner through the user interface 316.

The short-term sales forecaster 308 may estimate short-term sales of a product, based on the details retrieved from the historical details database 302. In an example embodiment, the short-term sales forecaster 308 may estimate the short-term sales by computing a sales probability distribution pattern, for example, between a next order and a next-to-next order. Further, the sales probability distribution pattern may be determined as normal distribution, based on a mean value and a standard deviation of the historical sales data, for example, of the number of products sold over a predefined duration of time. In one example, the sales probability distribution pattern may be determined for the number of products sold over a duration of one month. In other example embodiments the sales probability distribution pattern may be determined with other distribution techniques such as, for example, Poisson distribution, without departing from the scope of the present disclosure.

Table 1 illustrates an example of the number of products sold over the period of one month as retrieved from the historical details database 302. As would be appreciated by a person skilled in the art, Table 1 is provided to aid with understanding the determination of the sales probability distribution pattern and should not be construed as limiting.

TABLE 1

| Product Identification Number | First Order | Second Order | Number of products sold |
|---|---|---|---|
| 1 | May 1 10:00 | May 1 19:00 | 100 |
| 1 | May 2 10:00 | May 2 19:00 | 115 |
| 1 | May 3 10:00 | May 3 19:00 | 152 |
| | . . . | | |
| 1 | May 29 10:00 | May 29 19:00 | 85 |
| 1 | May 30 10:00 | May 30 19:00 | 104 |
| 1 | May 31 10:00 | May 31 19:00 | 125 |

Based on the details available in the table 1, the mean and the standard deviation may be determined as:

$$\text{Mean }(\mu): \frac{100 + 115 + \ldots + 104 + 125}{31} = 104.4$$

$$\text{Standard deviation }(\sigma): \sqrt{\frac{100^2 + 115^2 + \ldots + 125^{\wedge}2}{31} - \mu^2} = 10.2$$

The short-term sales forecaster 308 may then determine a probability of short term demand $\rho_a$, based on the mean and the standard deviation. In an example embodiment, $\rho_a$ may also be understood as the probability distribution of demand until next order.

The long-term sales forecaster 310 may estimate long-term sales of a product, based on the details retrieved from the historical details database 302 and the product database 106. In an example embodiment, the long-term sales forecaster 310 may estimate the long-term sales by computing a sales probability distribution pattern, for example, between a next order and the expiration duration of the product. The expiration duration of the product may be obtained from the product database 106 to determine a time window for determining the sales probability distribution pattern.

Further, the sales probability distribution pattern may be determined as a normal distribution, based on a mean value and a standard deviation. The mean value and the standard deviation may further be determined based on the historical sales data, for example, the number of products sold over a predefined duration of time as summarized on the basis of the time window. In one example, the sales probability distribution pattern may be determined for the number of products sold over a duration of one month.

Table 2 illustrates an example of food products with their corresponding expiration duration as retrieved from the product database 106. In an example embodiment, the long-term sales forecaster 310 may utilize Table 1 and the Table 2 for determining the long-term sales. As would be appreciated by a person skilled in the art, Table 2 is provided to aid with understanding the determination of the sales probability distribution pattern and should not be construed as limiting.

TABLE 2

| Product Identification number | Product name | Expiration duration |
|---|---|---|
| 1 | Tuna Sandwich | 2 days |
| 2 | Cut-fruit bowl | 3 days |

Based on the details available in the table 1 and the table 2, the mean and the standard deviation may be determined as:

$$\text{mean }(\mu): \frac{215 + 267 + \ldots + 189 + 229}{31} = 212.3$$

$$\text{standard deviation }(\sigma): \sqrt{\frac{215^2 + 267^2 + \ldots + 229^{\wedge}2}{31} - \mu^2} = 30.5$$

The long-term sales forecaster 310 may then determine a probability of long-term demand $\rho_b$, based on the mean and the standard deviation. In an example.embodiment, $\rho_b$ may also be understood as the probability distribution of demand until selling term.

Upon determination of the short-term sales and the long-term sales by the short-term sales forecaster 308 and the long-term sales forecaster 310, respectively, the stock calculator 312 may determine the stock-out probability factor $P_a$ and the disposal probability factor $P_b$. The stock calculator 312 may determine the stock-out probability factor $P_a$ based on the number of products sold and the probability of long-term demand $\rho_a$. The stock calculator 312 may determine the disposal probability factor $P_b$ based on the number of products sold, the expiration duration, and the probability of short-term demand $\rho_b$.

In an example embodiment, the stock calculator 312 may determine a stock-out expectation and a disposal expectation, based on the probability of short-term demand $\rho_a$. and the probability of long-term demand $\rho_b$.

Stockout expectation=$\int_t^\infty (x-t)\cdot\rho_a(x)dx$

Disposal expectation=$\int_{-\infty}^t (t-x)\cdot\rho_b(x)dx$

In an example embodiment, "x" is indicative of an arbitral variable indicative of the stock amount and "t" is indicative of a proper stock.

The stock calculator 312 may further receive the risk balance factor. In an example embodiment, the risk balance factor may be a positive value and may be determined by the owner. The risk balance factor may be equal to a stock-out risk weight factor $W_a$ and a disposal risk weight factor $W_b$. Further, addition of $W_a$ and $W_b$ may be equal to 1. For example, in case of $W_a$ being 0.75 and $W_b$ being 0.25, the risk balance factor may be 3.

Further, the stock calculator 312 may determine a point of minimum total risk, which is based on the risk balance factor between the stock-out probability distribution and the disposal probability distribution.

$$\text{Risk} = \text{Stockout expectation} \times W_a + \text{Disposal expectation} \times W_b$$

In an example embodiment, in order to determine the point of minimum total risk, the stock calculator 312 may differentiate the total risk with respect to the proper stock (t).

$$W_a \times \frac{\partial(\text{Stockout expectation }(t))}{\partial t} = -W_b \times \frac{\partial(\text{Disposal expectation }(t))}{\partial t}$$

Further, by definition of the stock-out expectation and the disposal expectation, the stock-out probability factor $P_a$ and the disposal probability factor $P_b$ may be determined as:

$$\frac{\partial(\text{Stockout expectation }(t))}{\partial t} = \underbrace{(x-t) \cdot \rho_a(x)|_{x=t}}_{=0} - \underbrace{\int_t^\infty \rho_a(x)dx}_{\text{Prob of stockout}} = -P_a$$

$$\frac{\partial(\text{Disposal expectation }(t))}{\partial t} = \underbrace{(t-x) \cdot \rho_b(x)|_{x=t}}_{=0} + \underbrace{\int_t^\infty \rho_b(x)dx}_{\text{Prob of stockout}} = P_b$$

Therefore, the stock calculator 312 may determine a condition for the minimum total risk point as:

$$\text{Probability of stockout }(P_a) : \text{Probability of disposal }(P_b) = W_b : W_a$$

In an example embodiment, the stock calculator 312 may determine the number of proper stock (t) which satisfies the condition:

$$P_a : P_b = W_b : W_a.$$

Figure 4:
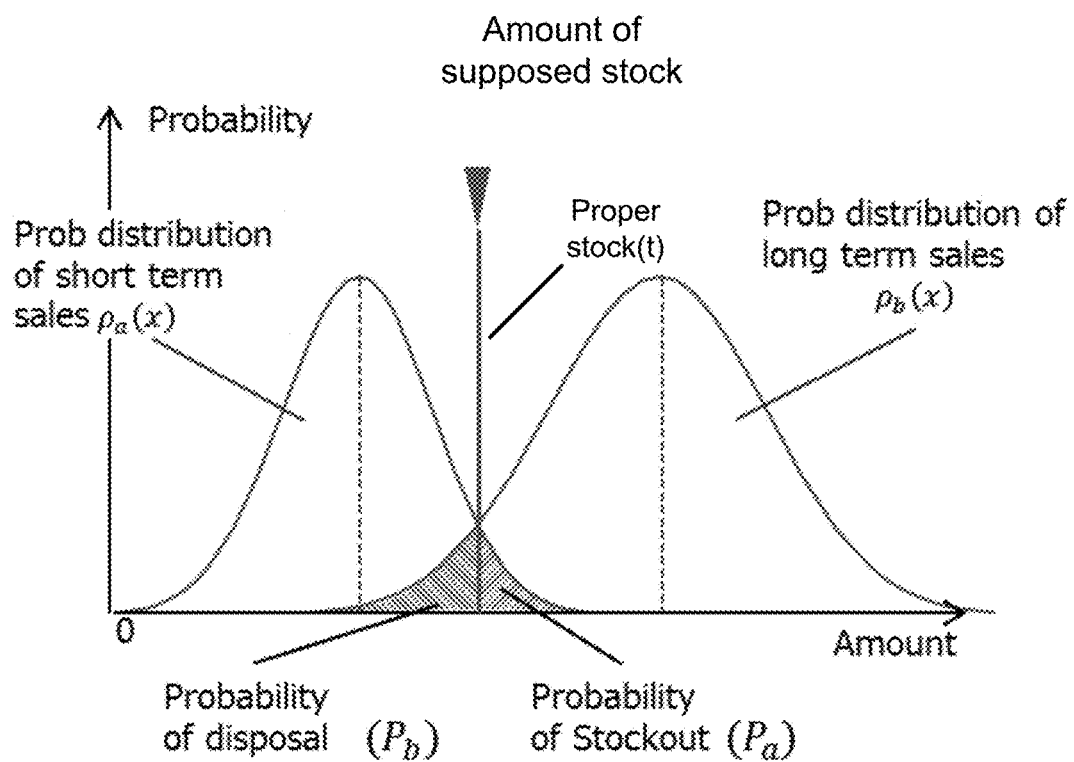
FIG. 4 illustrates a graph depicting a relationship between an amount of sales and a probability of disposal and stock-out, according to an example embodiment of the present disclosure.

FIG. 4 illustrates a graph depicting the stock-out probability factor $P_a$ and the disposal probability factor $P_b$, according to an example embodiment of the present disclosure. As illustrated, an amount of order may be illustrated by abscissa and a probability factor may be illustrated by ordinate. The graph also indicates the proper stock (t) as well. Because the system 102 considers the disposal risk along with the stock-out risk for determination of the proper stock of the products, the accuracy of the determination of the stock is improved.

Figure 5:
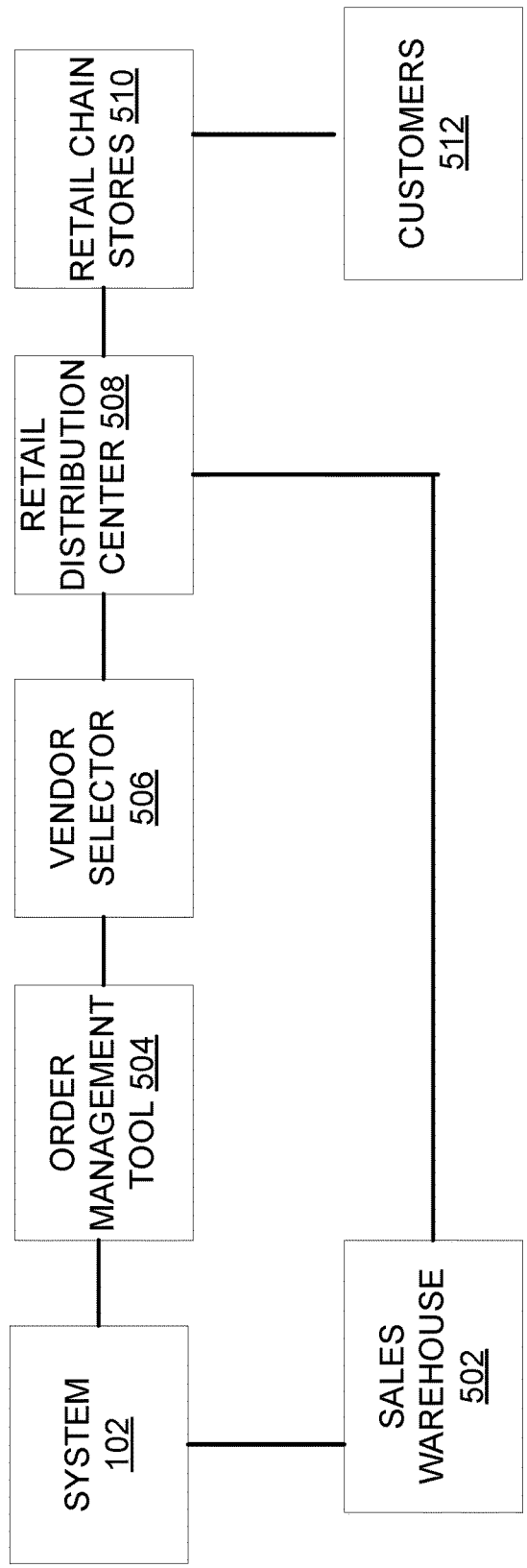
FIG. 5 illustrates a block diagram indicating an implementation of the system, according to an example embodiment of the present disclosure.

FIG. 5 illustrates a block diagram indicating an implementation of the system 102, according to an example embodiment of the present disclosure. The system 102 may be in communication with a sales warehouse 502 and an order management tool 504. The order management tool 504 may be in communication with a vendor selector 506. The vendor selector 506 may be in communication with a retail distribution center 508. The retail distribution center 508 may be in communication with the sales warehouse 502 and retail chain stores 510. The retail chain store 510 may provide customers 512 with the products.

In an example embodiment, the system 102 may receive the stock parameters from the sales warehouse 502. The system 102 may determine the number of products to replenish the inventory, based on the stock-out probability factor, the disposal probability factor, and the risk balance factor. The system 102 may forward details pertaining to the determination to the order management tool 504. The order management tool 504 may determine the purchase order to be placed and forward the purchase order to the vendor selector 506. The vendor selector 506 may then select the vendor 110 for placing the order based on factors, such as credibility of the vendor 110, capability of the vendor 110 to fulfill the purchase order, and historical details pertaining to previous purchase orders fulfilled by the vendor 110.

Upon receiving the purchase order, the vendor 110 may supply the products to replenish the inventory to the retail distribution center 508. In an example embodiment, the retail distribution center 508 may update the inventory in the sales warehouse 502, accordingly. Further, the retail distribution center 508 may distribute the supplied products to the retail chain stores 510, based on respective demand of the products in each of the retail chain stores 510. From the retail chain stores, the products may be provided to the customer 512.

In an example embodiment, the system 102 may be implemented in a convenience store selling food items, for example, milk cartons. There may be one or more of motion sensors, RFID readers, barcode scanners, and video capture devices installed in the convenience store. These components may be part of stock detector 202 for monitoring the movement of the milk cartons in order to meet the demand of the milk cartons. The stock detector 202 may detect some of the stock parameters, such as a number of milk cartons sold till a point in time and a number of milk cartons available in the inventory at the point in time.

The receiver 204 may receive the stock parameters from the stock detector 202. Further, stock parameters, such as information identifying the expiration duration of the milk cartons may be stored in an internal database or an external database. For example, the expiration duration of the milk cartons may be 1 week after a corresponding manufacturing date. The receiver 204 may also receive such stock parameters from an external database or an internal database.

The stock analyzer 206 may then determine the stock-out probability factor and the disposal probability factor, based on the stock parameters. In particular, the stock analyzer 206 may determine the stock-out probability factor based on the number of the milk cartons sold and estimated short term sales of the milk cartons. Further, the stock analyzer 206 may determine the disposal probability factor based on the number of the milk cartons sold, the expiration duration, and estimated long term sales of the milk cartons. The long-term sales and the short-term sales of the milk cartons may be estimated as explained earlier.

The stock analyzer 206 may then determine the risk balance factor for the sale of the milk cartons. Further, the stock analyzer 206 may determine a number of the milk cartons to replenish the inventory to meet the estimated sales, based on the stock-out probability factor, the disposal probability factor, and the risk balance factor. Accordingly, the stock analyzer 206 may place a purchase order to a vendor for ordering the appropriate number of the milk cartons for replenishing the inventory so as to minimize both the stock-out risk and the disposal risk.

Figure 6:
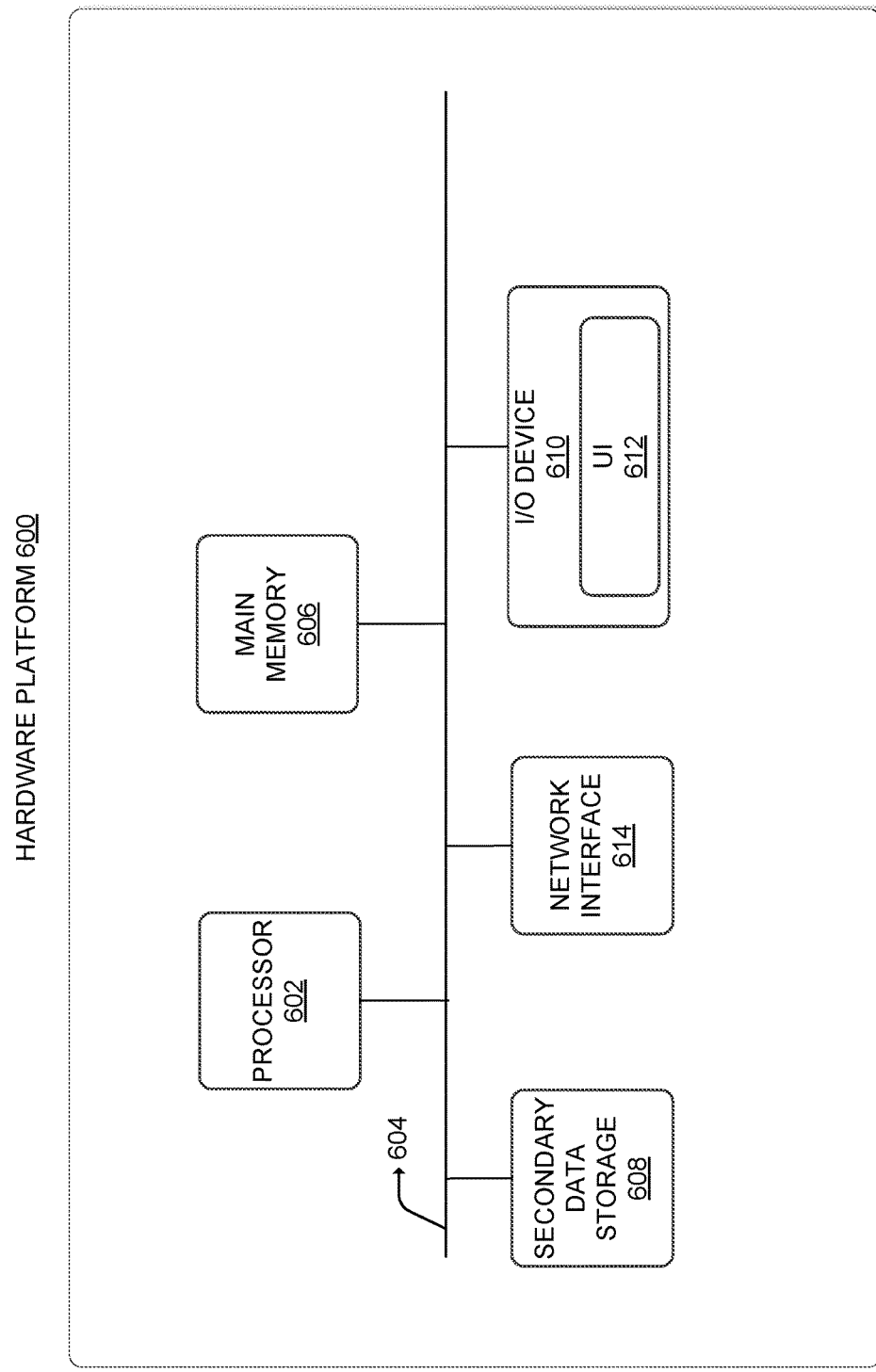
FIG. 6 illustrates a hardware platform for implementation of the system, according to an example embodiment of the present disclosure.

FIG. 6 illustrates a hardware platform 600 for implementation of the system 102, according to an example of the present disclosure. In an example embodiment, the hardware platform 600 may be a computing device for implementing the system 102 that may be used with the examples described herein. The computing device may represent a computational platform that includes components that may be in a server or another computing device. In an example embodiment, the computing device may include, but is not limited to, a laptop, a desktop, a smartphone, or special purpose computing device. The computing device may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computing device may include a processor 602 that may implement or execute machine readable instructions for performing some or all of the methods, functions, techniques and/or other processes described herein. Commands and data from the processor 602 may be communicated over a communication bus 604. The computing device may also include a main memory 606, such as a random access memory (RAM), where the machine readable instructions and data for the processor 602 may reside during runtime, and a secondary data storage 608, which may be a non-volatile memory and may store machine readable instructions and data. The main memory 606 and the data storage 608 are examples of non-transitory computer readable mediums. The main memory 606 and/or the secondary data storage 608 may store data used by the system 102, such as an object repository including web objects, configuration data, test data, etc.

The computing device may include an Input/Output (I/O) device 610, such as a keyboard, a mouse, a display, etc. The input/output device 610 may include a user interface (UI) 612 for interacting with a user of the system 102. The UI 612 may operate with I/O device 610 to accept from and provide data to a user. The computing device may include a network interface 614 for connecting to a network. Other known electronic components may be added or substituted in the computing device. The processor 602 may be designated as a hardware processor. The processor 602 may execute various components of the system 102 described above and perform the methods described below.

Figure 7:
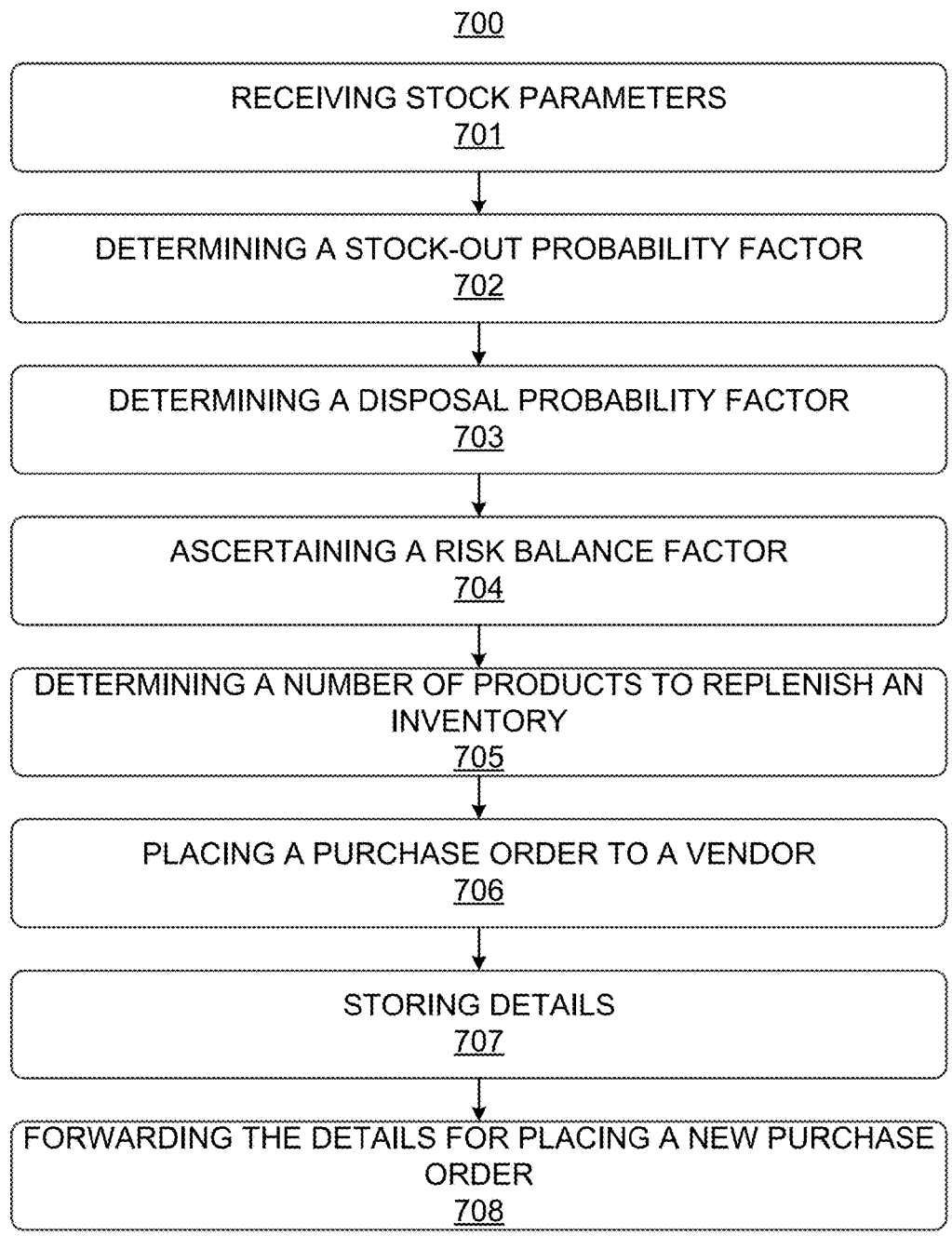
FIG. 7 illustrates a flowchart depicting a computer-implemented method for automatic ordering of products, according to an example embodiment of the present disclosure.

FIG. 7 illustrates a flowchart depicting a computer-implemented method 700 for automatic ordering of products, according to an example embodiment of the present disclosure. The method 700 may be performed by one or more servers or other types of computers including at least one processor executing machine readable instructions embodying the methods. For example, the system 102 illustrated in FIG. 1 may store machine readable instructions embodying the method 700, and the processor 602 may execute the machine readable instructions. The method 700 is described by way of an example as being performed by the system 102.

At 701, the method 700 may commence by receiving the stock parameters. In an example embodiment, the stock parameters include information identifying at least one of the number of products sold till a point in time, the expiration duration for usage of products, or the number of products available in an inventory at the point in time. In an example embodiment, the number of products sold till the point in time and the number of products available in the inventory at the point in time may be detected.

At 702, the method 700 includes determining the stock-out probability factor indicative of a probability of selling out the number of products available in the inventory. The stock-out probability factor may be determined, based on the number of products sold and the estimated short term sales.

At 703, the disposal probability factor, indicative of a probability of an event where the products have to be disposed after the expiration duration is over, is determined. The disposal probability factor may be determined based on the number of products sold, the expiration duration, and the estimated long term sales.

At 704, the risk balance factor indicative of a ratio of the disposal probability factor to the stock-out probability factor may be ascertained.

At 705, the number of products to replenish the inventory may be determined. In an example embodiment, the number of products may be determined based on the stock-out probability factor, the disposal probability factor, and the risk balance factor.

At 706, the purchase order may be placed to the vendor 110 for acquiring the number of products for replenishing the inventory. At 707, the method 700 includes storing the details pertaining to the number of products sold, the expiration duration, the number of products available in the inventory, the stock-out probability factor, the disposal probability factor, the risk balance factor, the number of products to replenish the inventory, and the placing of the purchase order, over a period of time.

At 708, the method 700 includes forwarding the details to the stock analyzer for placing the new purchase order to acquire the number of products for replenishing the inventory at the subsequent time point. In an example embodiment, a report pertaining to the placing of the purchase order may be generated. The report may include, but is not limited to the number of products sold, the expiration duration, the number of products available in the inventory, the stock-out probability factor, the disposal probability factor, the risk balance factor, and the number of products to replenish the inventory.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A system for automatic ordering of products, the system comprising:
a receiver to receive stock parameters, wherein the stock parameters include information identifying at least one of:
a number of products sold till a point in time,
an expiration duration for usage of products, or
a number of products available in an inventory at the point in time;
a stock analyzer in communication with the receiver to:
determine a stock-out probability factor, the stock-out probability factor:
indicative of a probability of selling out the number of products available in the inventory, and
based on the number of products sold and estimated short term sales;
determine a disposal probability factor, the disposal probability factor:

indicative of a probability of an event where the products are to be disposed after the expiration duration is over, and based on the number of products sold, the expiration duration, and estimated long term sales;

ascertain a risk balance factor indicative of a ratio of the disposal probability factor to the stock-out probability factor;

determine a number of products to replenish the inventory, based on the stock-out probability factor, the disposal probability factor, and the risk balance factor; and issue a purchase order to a vendor, the vendor for providing the number of products for replenishing the inventory; and a learner in communication with the receiver and the stock analyzer to:

store, over a predetermined period of time, details pertaining to the number of products sold, the expiration duration, the number of products available in the inventory, the stock-out probability factor, the disposal probability factor, the risk balance factor, the number of products to replenish the inventory, and the placing of the purchase order; and forward the details for placing a new purchase order to acquire a number of products for replenishing the inventory at a subsequent point in time.

2. The system of claim 1 further comprising a stock detector in communication with the receiver to:

detect the number of products sold till the point in time and the number of products available in the inventory at the point in time; and forward information identifying the number of the products sold and the number of products available in the inventory to the receiver.

3. The system of claim 2 wherein the stock detector includes at least one of a Radio Frequency Identification (RFID) reader, a video surveillance device, or a sensor.

4. The system of claim 1 further comprising:

a report generator to generate a report pertaining to the placing of the purchase order, wherein the report includes information identifying at least one of the number of products sold, the expiration duration, the number of products available in the inventory, the stock-out probability factor, the disposal probability factor, the risk balance factor, and the number of products to replenish the inventory.

5. The system of claim 1, wherein the stock analyzer is to estimate the short-term sales of the product, based on historical details pertaining to the order.

6. The system of claim 5, wherein the stock analyzer is to estimate the short-term sales by computing a sales probability distribution pattern between a next order and a next-to-next order.

7. The system of claim 1, wherein the stock analyzer is to estimate the long-term sales of the product, based on historical details pertaining to the order and details pertaining to the product.

8. The system of claim 7, wherein the stock analyzer is to estimate the long-term sales by computing a sales probability distribution pattern between a next order and the expiration duration of the product.

9. The system of claim 1, wherein the products include perishable products, medicines, and seasonal products.

10. A system for automatic ordering of products, the system comprising:

a receiver to receive stock parameters, wherein the stock parameters include information identifying at least one of:

a number of products sold till a point in time, an expiration duration for usage of products, or a number of products available in an inventory at the point in time; and a stock analyzer in communication with the receiver to:

determine a stock-out probability factor, the stock-out probability factor:

indicative of a probability of selling out the number of products available in the inventory, and based on the number of products sold and estimated short term sales;

determine a disposal probability factor, the disposal probability factor:

indicative of a probability of an event where the products are to be disposed after the expiration duration is over, and based on the number of products sold, the expiration duration, and estimated long term sales;

ascertain a risk balance factor indicative of a ratio of the disposal probability factor to the stock-out probability factor;

determine a number of products to replenish the inventory, based on the stock-out probability factor, the disposal probability factor, and the risk balance factor; and issue a purchase order to a vendor, the vendor for providing the number of products for replenishing the inventory.

11. The system of claim 10 further comprising a stock detector in communication with the receiver to:

detect the number of products sold till the point in time and the number of products available in the inventory at the point in time; and forward information identifying the number of the products sold and the number of products available in the inventory to the receiver.

12. The system of claim 11 wherein the stock detector includes at least one of a Radio Frequency Identification (RFID) reader, a video surveillance device, or a sensor.

13. The system of claim 10 further comprising a learner in communication with the receiver and the stock analyzer to:

store, over a predetermined period of time, details pertaining to the number of products sold, the expiration duration, the number of products available in the inventory, the stock-out probability factor, the disposal probability factor, the risk balance factor, the number of products to replenish the inventory, and the placing of the purchase order; and forward the details to the stock analyzer for placing a new purchase order to acquire a number of products for replenishing the inventory at a subsequent time point.

14. The system of claim 10 further comprising:

a report generator to generate a report pertaining to the placing of the purchase order, wherein the report includes information identifying at least one of the number of products sold, the expiration duration, the number of products available in the inventory, the stock-out probability factor, the disposal probability factor, the risk balance factor, and the number of products to replenish the inventory.

15. The system of claim 10, wherein the stock analyzer to estimate the short-term sales of the product, based on historical details pertaining to the order.

16. The system of claim 10, wherein the stock analyzer to estimate the long-term sales of the product, based on historical details pertaining to the order and details pertaining to the product.

17. A computer-implemented method, for automatic ordering of products, executed by at least one processor, the method comprising:
receiving stock parameters, wherein the stock parameters include information identifying at least one of a number of products sold till a point in time, an expiration duration for usage of products, or a number of products available in an inventory at the point in time;
determining a stock-out probability factor indicative of a probability of selling out the number of products available in the inventory, based on the number of products sold and estimated short term sales;
determining a disposal probability factor indicative of a probability of an event where the products are to be disposed after the expiration duration is over, based on the number of products sold, the expiration duration, and estimated long term sales;
ascertaining a risk balance factor indicative of a ratio of the disposal probability factor to the stock-out probability factor;
determining a number of products to replenish the inventory, based on the stock-out probability factor, the disposal probability factor, and the risk balance factor;
issuing a purchase order to a vendor for providing the number of products for replenishing the inventory;
storing, over a predetermined period of time, details pertaining to the number of products sold, the expiration duration, the number of products available in the inventory, the stock-out probability factor, the disposal probability factor, the risk balance factor, the number of products to replenish the inventory, and the placing of the purchase order; and
forwarding the details for placing a new purchase order to acquire a number of products for replenishing the inventory at a subsequent time point.

18. The method of claim 17 further comprising detecting the number of products sold till the point in time and the number of products available in the inventory at the point in time.

19. The method of claim 17 further comprising:
generating a report pertaining to the placing of the purchase order, wherein the report includes information identifying at least one of the number of products sold, the expiration duration, the number of products available in the inventory, the stock-out probability factor, the disposal probability factor, the risk balance factor, and the number of products to replenish the inventory.

20. The method of claim 17 further comprising:
estimating the short-term sales of the product, based on historical details pertaining to the order; and
estimating the long-term sales of the product, based on historical details pertaining to the order and details pertaining to the product.

* * * * *